Jan. 9, 1940.                F. L. MAIN                2,186,834
                          BRAKE MECHANISM
              Filed Sept. 29, 1937         2 Sheets-Sheet 1
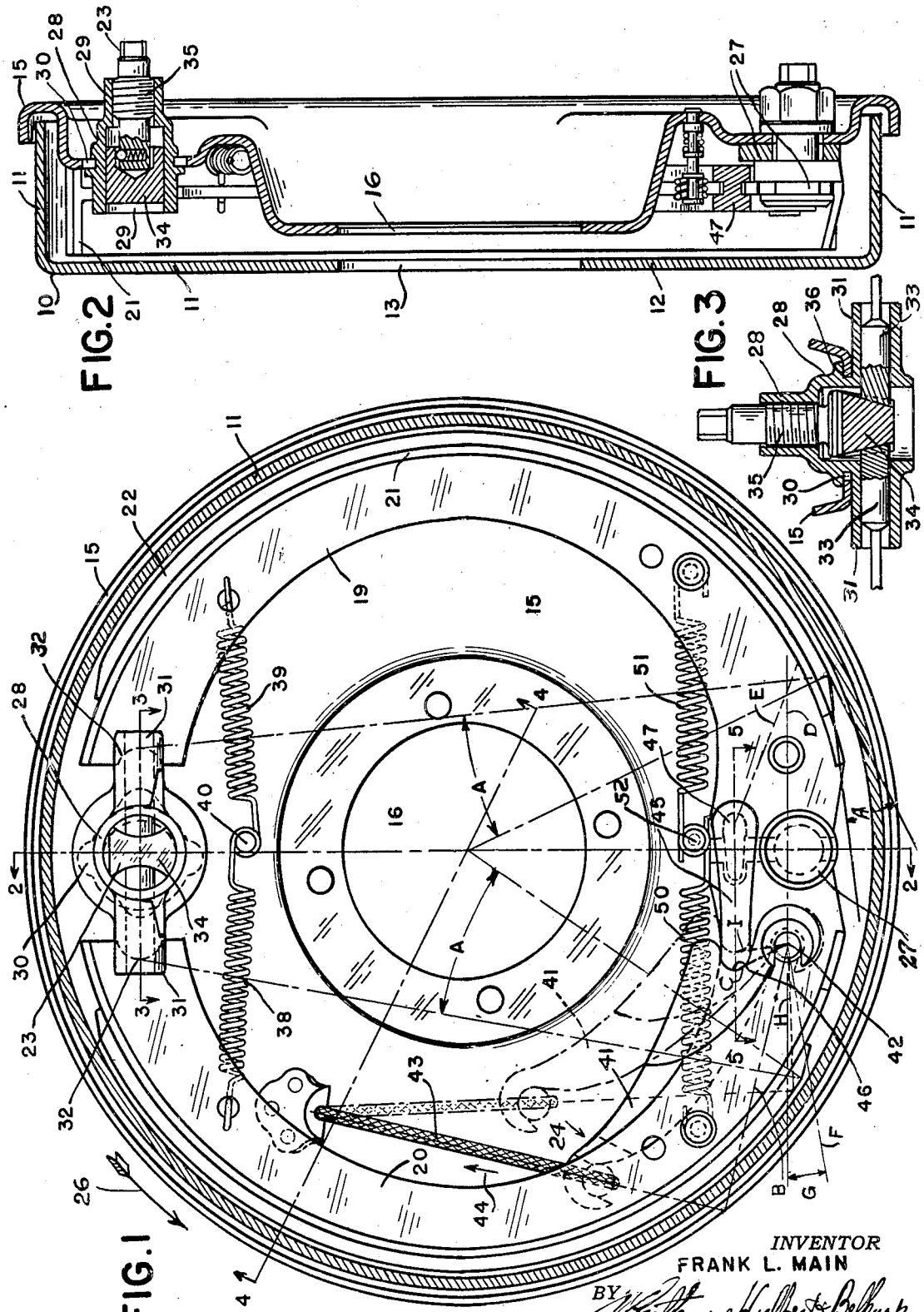
INVENTOR
FRANK L. MAIN
BY
ATTORNEY

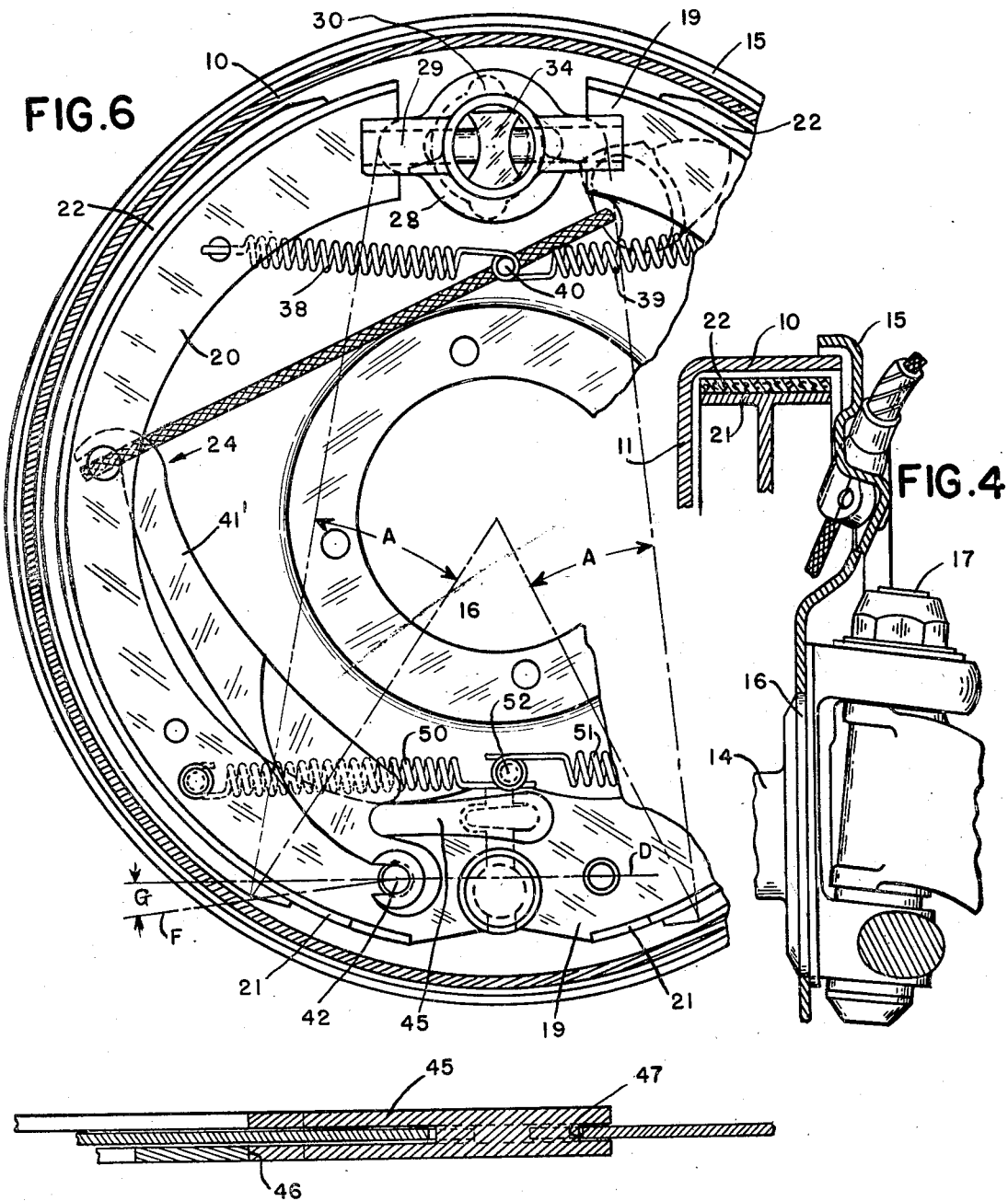

Patented Jan. 9, 1940

2,186,834

UNITED STATES PATENT OFFICE 2,186,834

BRAKE MECHANISM

Frank L. Main, Birmingham, Mich., assignor to Kelsey-Hayes Wheel Company, Detroit, Mich., a corporation of Delaware Application September 29, 1937, Serial No. 166,439

8 Claims. (Cl. 188—78)

This invention relates generally to brake mechanism and refers more particularly to improvements in the actuator for the brake friction means.

One of the principal objects of the present invention resides in the provision of brake actuating mechanism of the link and lever type so constructed and arranged that a more advantageous actuating angle for the brake friction means is provided. In accordance with this invention, the actuator is effective in the forward direction of rotation to apply a force to the adjacent end of the leading portion of the brake friction means in a direction predetermined to insure smooth controllable action of this portion of the friction means and, in the reverse direction of rotation of the drum, to apply a force to the adjacent end of the trailing shoe at a slight positive angle in order to insure stopping of the vehicle in reverse with a relatively light pedal pressure.

Another advantageous feature of this invention resides in the provision of brake mechanism embodying brake shoes and having an adjustment device and an actuator of the type previously set forth, respectively, associated with opposite ends of the shoes in such a manner as to render it possible to utilize symmetrical shoes and linings, as well as a lining attack angle for the actuator ends of the shoes, which is sufficient to provide a smooth controllable brake.

A further object of the present invention resides in the provision of actuating mechanism of the link and lever type interconnecting the actuator ends of the brake friction means and proportioned to provide a receding leverage as the brake friction means approaches the brake flange of the drum. One of the outstanding advantages derived by employing receding leverage means is that it permits the actuating cable to leave the backing plate of the brake drum at the top of the kingpin and, in addition, permits the primary shoe to engage the drum at the lower side of the latter, which is the most desirable portion of the drum from the standpoint of effective braking. In addition, the receding leverage actuator conserves pedal travel when the drum expands due to heat by reducing the actuating leverage.

A further object of this invention resides in the provision of a brake offering the possibility of employing an actuator having a substantially uniform leverage throughout brake operation. This type of leverage is particularly advantageous when the brake is designed for use on vehicles where a relatively light pedal pressure is desired for deceleration from all speeds.

The foregoing, as well as other objects, will be made more apparent as this description proceeds, especially when considered in connection with the accompanying drawings, wherein:

Figure 1 is a side elevational view, partly in section, of a brake drum equipped with brake mechanism constructed in accordance with this invention;

Figure 2 is a sectional view taken substantially on the plane indicated by the line 2—2 of Figure 1;

Figure 3 is a sectional view taken substantially on the plane indicated by the line 3—3 of Figure 1;

Figure 4 is a sectional view taken substantially on the plane indicated by the line 4—4 of Figure 1;

Figure 5 is a sectional view taken substantially on the plane indicated by the line 5—5 of Figure 1; and Figure 6 is a fragmentary side elevational view of a slightly modified form of construction.

The brake selected herein for the purpose of illustrating the present invention is provided with a brake drum 10 having an annular axially extending brake flange 11 and having a web 12 formed with an opening 13 through the central portion thereof for receiving a wheel spindle 14. In accordance with conventional practice, the rear side of the drum is closed by a backing plate 15 having an opening 16 therethrough in alignment with the opening 13 in the web of the brake drum to permit the spindle 14 to extend through the drum and having a bolting-on portion surrounding the opening 16 adapted to be secured to the spindle 14. In Figure 4 of the drawings, the spindle is shown as connected to the axle of the vehicle by means of a kingpin 17 arranged on an up and down axis predetermined to provide for the proper turning of the wheel and associated brake drum.

The backing plate 15 forms a support for the brake mechanism and the latter is shown in Figure 1 as including a pair of brake shoes 19 and 20. In the present instance, the shoes are substantially T-shaped in cross section and are supported on the backing plate within the drum with the axially extending portions 21 located adjacent the inner surface of the brake flange 11 on the drum. A brake lining 22 having the desired co-efficient of friction is secured to the outer surface of each of the axially extending portions 21 of the shoes for engagement with the inner annular surface of the brake flange 11 when the shoes are moved radially outwardly relative to the drum.

Referring again to Figure 1 of the drawings, it will be noted that the opposite ends of the shoes are spaced from each other circumferentially of the drum and that the two shoes, as well as the linings carried thereby, are symmetrical with respect to the axis of rotation of the drum. In other words, the two shoes are interchangeable and this is desirable from the standpoint of manufacture, since it reduces the number of differently designed parts to the minimum.

An adjustment anchor device 23 is supported on the backing plate 15 between the ends of the brake shoes at one side of the drum, and an actuator 24 is associated with the ends of the brake shoes at the opposite side of the drum. Both the adjustment anchor device and actuator permit circumferential shifting movement of the brake shoes in the forward direction of rotation of the brake drum, designated in Figure 1 by the arrow 26. The construction is such that when the brake shoes are moved by the actuator into engagement with the brake flange 11 of the drum in the forward direction of rotation of the latter, torque is transferred from the primary shoe 19 through the adjustment device 23 to the secondary shoe 20, and the resulting servo action assists in applying the brake friction means. On the other hand, when the brake friction means is applied in the reverse direction of rotation of the brake drum by the actuator, the adjustment device 23 anchors the shoes on the backing plate 15 and a symmetrical brake results.

The adjustment anchor device 23, aside from anchoring the brake shoes in the reverse direction of rotation, also functions to move the shoes outwardly relative to the brake drum to vary the clearance between the brake linings and the inner annular surface of the brake flange 11. The shoes are moved by the adjustment device about an abutment 27 secured to the backing plate between the actuator ends of the shoes and engageable with the latter ends of the shoes. The abutment 27 is in the form of a stud which is secured to the backing plate for limited radial displacement relative thereto in order to insure proper centering of the brake friction means within the brake drum.

In the present instance, the adjustment device 23 comprises a bracket 28 having an axially bored portion 29 extending out of the drum through an opening 30 in the backing plate and having tubular extensions 31 extending at right angles to the axis of the bore in substantial alignment with the adjustment ends of the brake shoes. The extremities of the web portions of the adjustment ends of the shoes project into the outer ends of the extensions and are recessed, as at 32, to provide a bearing engagement with the adjacent ends of the links or plungers 33. The plungers 33 are slidably supported in the extensions 31, and the adjacent ends of the plungers are engaged by a wedge 34 movable axially of the bore in the bracket by means of a screw 35 threaded in the portion 29 of the bracket and accessible for manipulation from a point exteriorly of the backing plate.

It may be pointed out at this time that the adjustment anchor device maintains the adjustment ends of the shoes in such spaced relation to each other that an "attack angle" A for both shoes is provided which is sufficient to secure smooth brake operation. The "attack angle" of a brake shoe depends upon the location of the fulcrum about which the toe of the shoe swings into engagement with the drum and also depends upon the location of the toe end of the brake friction means on the shoe. Briefly, the "attack angle" is the instantaneous angle at which the toe end of the friction means on the shoe contacts with the drum as the shoe is swung into engagement with the drum. In other words, the "attack angle" is the angle that exists between a line drawn from the fulcrum point of the shoe to the toe of the friction means and a line tangent to this line at the point of contact of the toe with the brake drum. In the interests of clarity, the angle is usually indicated as the angle between a line connecting the toe of the brake friction means with the fulcrum point of the shoe and a radius of the drum passing through the toe of the brake friction means. For the purpose of illustration, I have shown the "attack angle" for each shoe as being approximately 23° and this is accomplished in a construction where the shoes and linings are symmetrical or interchangeable.

It has previously been stated that the adjustment anchor device renders it possible to transmit torque from the primary shoe to the secondary shoe in the forward direction of rotation and serves as an anchor for the shoes in the reverse direction of rotation. Upon reference to Figure 3, it will be noted that the opening 30 through the backing plate is sufficiently larger than the diameter of the portion of the bracket extending therethrough to permit the shifting movement of the bracket required in the forward direction of rotation to transfer the torque. In the reverse direction of rotation, the bracket anchors against the side 36 of the opening 30. In this connection, attention may be called to the fact that the adjustment ends of the shoes are normally yieldably maintained into engagement with the plungers 33 by means of the retracting springs 38 and 39. The outer ends of these springs are respectively connected to the adjustment ends of the shoes, and the inner ends of the springs are connected to a stud 40 secured to the backing plate. The stud 40 is offset in a direction toward the primary shoe 19 from a plane including the axis of rotation of the drum and the axis of the wedge so that the spring 38 will exert a greater force on the secondary shoe. In other words, the spring 38 maintains the bracket 28 in contact with the side 36 of the opening 30.

In the present instance, the actuator 24 is of the link and lever type. This actuator comprises a lever 41 having one end pivotally connected to the shoe 20 adjacent the actuator end of the latter by means of a pivot 42 and having the opposite end connected to a suitable control (not shown) by means of a cable 43. The cable 43 extends out of the drum through the backing plate at a point substantially in alignment with the axis of the kingpin 17 and the arrangement is such that movement of the cable in the direction of the arrow 44 reduces the effective leverage arm, designated in Figure 1 by the reference character B. The lever 41 is operatively connected to the primary shoe by means of a link 45 having one end engaging in a recess 46 in the lever 41 adjacent the pivot 42 to provide a fulcrum for the lever 41 spaced from the pivot 42 the length of the short lever arm, identified in Figure 1 by the reference character C. The opposite end of the link is fulcrumed, as at 47, on the actuator end of the primary shoe 19 at a point predetermined to exert a force on the actuator end of the primary shoe in the direction of the line D which is substantially perpendicular to a line passing through the axis of the abutment and the axis of rotation of the drum. At this time it may be pointed out that the actuating angle of a shoe can be defined as the angle between a line perpendicular to the radius of the brake drum passing through the axis of the abutment upon which the shoe seats when released and a line representing the direction in which the actuating force is applied to the shoe. The actuating angle is termed a positive angle if it is radially outwardly of the perpendicular. In Figure 1, the actuating angle for the primary shoe is substantially zero with the result that the shoe has a smooth action against the brake flange and will not grab, as would be the case if the force were applied at a positive angle, as in the direction of the dotted line E.

Assuming now that the brake drum is rotating in the reverse direction and that the lever 41 is moved in the direction of the arrow 44 by the cable 43, it will be noted that the end of the lever, pivoted to the actuator end of the secondary shoe 20 by the pin 42, swings about the fulcrum 46 provided by the link 45 and applies a force to the actuator end of the shoe 20 in the direction substantially indicated by the line F in Figure 1. In other words, a force is applied to the actuator end of the shoe 20 at a positive actuating angle G when the drum is rotating in the reverse direction and, while this will effect a slight grabbing action, nevertheless, this is desirable instead of being objectionable in the reverse direction of rotation, especially in cases where no torque is transferred in reverse, because it renders braking more effective with a relatively light pedal pressure.

Reference has also been made above to the fact that the lever 41 is of the receding type in that the internal leverage is reduced as the brake shoe approaches engagement with the brake flange 11. In this connection, it will be noted from Figure 1 that at the start of movement of the lever 41 in a direction to expand the shoes into engagement with the drum, the leverage ratio is $$\frac{B}{C}$$

whereas at the completion of the movement of the lever 41, indicated by the dotted lines in Figure 1, the leverage arm B has been reduced in length, as indicated by the letter H, and the leverage arm C has been increased in length to the extent indicated by the leverage arm I. In other words, the internal leverage has been gradually reduced from the leverage ratio $$\frac{B}{C}$$

to the leverage ratio $$\frac{H}{I}$$

This arrangement renders it possible to obtain effective braking, irrespective of drum expansion because when the drum expands due to heat, the leverage ratio is reduced and less pedal travel is required. Also, the above type of construction offers the possibility of locating the primary shoe on the ground side of the brake drum, and this arrangement contributes to securing satisfactory brake operation.

It will be observed from Figure 1 that the actuator ends of the two shoes are normally maintained into engagement with the abutment 27 by means of a pair of retraction springs 50 and 51. The outer ends of these springs are, respectively, connected to the shoes 19 and 20 and the inner ends of the springs are connected to an abutment 52 secured to the backing plate at a point offset toward the primary shoe from the plane including the axis of the stud 27 and axis of rotation of the drum. The arrangement is such that the spring 50 exerts a greater force on the secondary shoe 20 than the spring 51 exerts on the primary shoe and, as a result, the primary shoe is moved outwardly ahead of the secondary shoe.

The embodiment of the invention illustrated in Figure 6 shows a brake construction similar to the one previously described, with the exception that the lever 41' is of the constant leverage type and the included angle between the lever and the cable is maintained substantially constant throughout the brake application. This modification may be advantageously used in cases where it is desired to decelerate the vehicle at all speeds with a relatively light pedal pressure and, as a consequence, renders control of the brakes easier during emergency high speed stops.

What I claim as my invention is:

1. In brake mechanism, a brake drum rotatable in opposite directions, brake friction means supported within said drum for movement relative to the latter into engagement therewith and having spaced ends, and an actuator of the link and lever type interconnecting said ends and effective in the forward direction of rotation of the drum to move the end of the leading portion of the friction means into engagement with the drum at a substantially zero actuating angle and upon reverse direction of rotation of the drum to move the adjacent end of the friction means into engagement with the drum at a positive actuating angle.

2. In brake mechanism, a revoluble brake drum, a pair of brake shoes located within the drum and movable relative to the drum into engagement therewith, means supporting the brake shoes in the drum with the primary shoe at the ground side of the drum and with the adjacent ends of the shoes in spaced relation to each other, adjustment means located between the ends of the shoes at one side of the drum providing for outward movement of the shoes into engagement with the drum, and an actuator of the link and lever type interconnecting the opposite ends of the shoes and effective to move the primary shoe outwardly relative to the brake drum into engagement therewith at a substantially zero actuating angle.

3. In brake mechanism, a revoluble brake drum, a pair of brake shoes located within the drum and movable relative to the drum into engagement therewith, means supporting the brake shoes in the drum with the primary shoe at the ground side of the drum and with the adjacent ends of the shoes in spaced relation to each other, adjustment means located between the ends of the shoes at one side of the drum providing for outward movement of the shoes into engagement with the drum, and an actuator of the link and lever type interconnecting the opposite ends of the shoes and effective to move the primary shoe outwardly into engagement with the drum at a substantially zero actuating angle and to move the secondary shoe into engagement with the drum at a positive actuating angle.

4. In brake mechanism, a brake drum rotatable in opposite directions, brake friction means located within the drum and movable relative to the drum into engagement therewith and having spaced ends, means supporting the brake friction means within the drum for shifting movement circumferentially of the drum in the direction of forward rotation, means for anchoring the brake friction means in the reverse direction of rotation, and an actuator of the link and lever type interconnecting said ends of the friction means and effective to move the end of the leading portion of the friction means into engagement with the drum at a substantially zero actuating angle and effective in the reverse direction of rotation of the drum to move the opposite end of the friction means into engagement with the drum at a substantially positive actuating angle.

5. In brake mechanism, a brake drum rotatable in opposite directions, brake friction means supported within said drum for movement relative to the latter into engagement therewith and having spaced ends, an actuator of the link and lever type interconnecting said ends and comprising, a lever pivotally connected to the end of the trailing portion of the friction means, and a link having one end providing a fulcrum for said lever and having the other end operatively connected to the leading end of the friction means, said lever and link being arranged to actuate the leading portion of the friction means at a substantially zero actuating angle when the drum is rotating in the forward direction and to actuate the trailing end of the friction means at a positive actuating angle when the drum is rotating in the reverse direction.

6. In brake mechanism, a brake drum rotatable in opposite directions, brake shoes supported within the drum for shifting movement circumferentially of the drum in the direction of forward rotation of the latter and having spaced ends, a backing plate for the drum, an adjustment anchor device extending through an enlarged opening in the backing plate between adjacent ends of the shoes and shiftable with the shoes in the forward direction of rotation of the drum, and an actuator of the link and lever type interconnecting the opposite ends of the shoes and effective in the forward direction of rotation to move the end of the leading shoe toward the drum at a substantially zero actuating angle and effective in the reverse direction of rotation of the drum to move the end of the trailing shoe toward the drum at a positive actuating angle.

7. In brake mechanism, a revoluble brake drum, a backing plate, a pair of brake shoes supported within the drum for movement relative to the latter into engagement therewith and having the opposite ends spaced from each other, a connection between the ends of the shoes at one side of the drum arranged to transfer torque from the primary shoe to the secondary shoe in the forward direction of rotation of the drum and to serve as an anchor for taking the torque of the secondary shoe upon reverse rotation of the drum, and an actuator of the link and lever type interconnecting the opposite ends of the shoes and effective in the forward direction of rotation of the drum to move the leading end of the primary shoe into engagement with the drum at a substantially zero actuating angle and upon reverse rotation of the drum to move the adjacent end of the secondary shoe into engagement with the drum at a positive actuating angle.

8. In brake mechanism, a revoluble brake drum, a backing plate, a pair of brake shoes supported within the drum for movement relative to the latter into engagement therewith and having the opposite ends spaced from each other, a bracket supported upon the backing plate between the ends of the shoes at one side of the drum and having a limited circumferential movement relative to the backing plate, a spring urging the bracket toward the primary shoe to permit a limited servo action upon forward rotation of the brake drum, and an actuator of the link and lever type interconnecting the opposite ends of the shoes and effective in the forward direction of rotation of the drum to move the leading end of the primary shoe into engagement with the drum at a substantially zero actuating angle and upon reverse rotation of the drum to move the adjacent end of the secondary shoe into engagement with the drum at a positive actuating angle.

FRANK L. MAIN.